March 1, 1949.        J. D. GAYER        2,463,097
BRUSHHOLDER
Filed Dec. 23, 1946        2 Sheets-Sheet 1
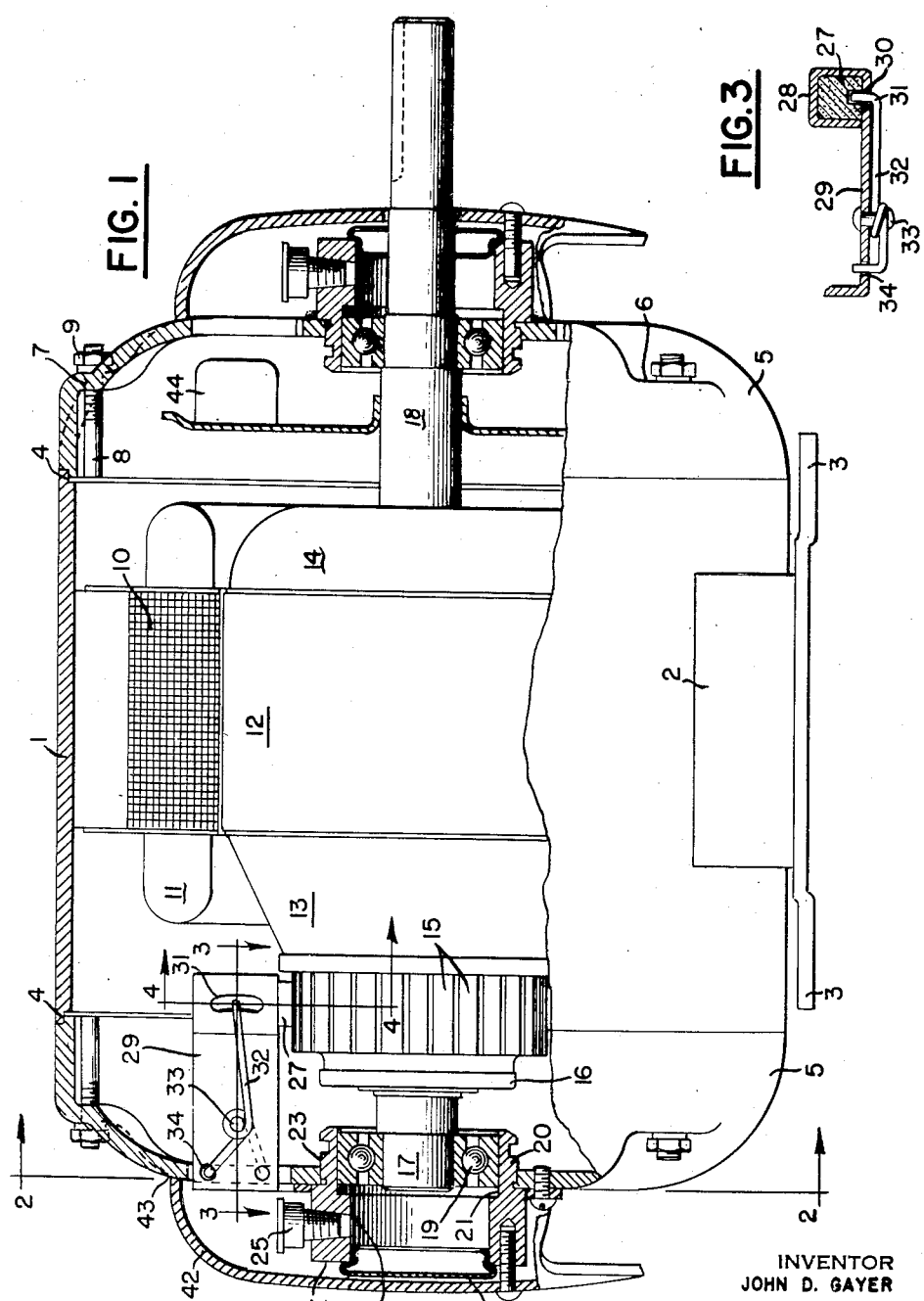
INVENTOR
JOHN D. GAYER
BY
Toulmin & Toulmin
ATTORNEYS March 1, 1949.   J. D. GAYER   2,463,097
BRUSHHOLDER
Filed Dec. 23, 1946   2 Sheets-Sheet 2
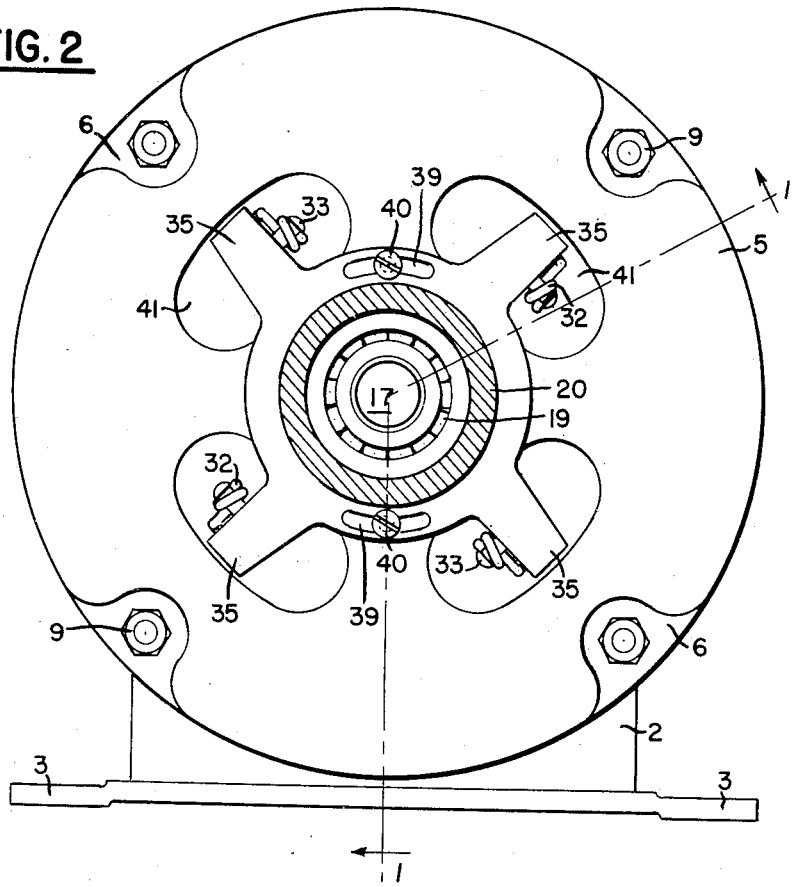
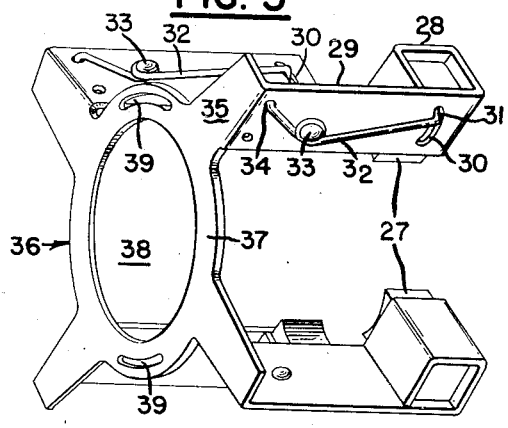
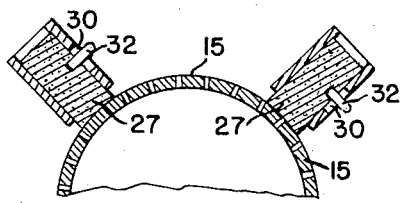
INVENTOR
JOHN D. GAYER
BY
Toulmin & Toulmin
ATTORNEYS Patented Mar. 1, 1949

2,463,097

UNITED STATES PATENT OFFICE 2,463,097

BRUSH HOLDER

John D. Gayer, Dayton, Ohio, assignor to The Brown-Brockmeyer Co., Dayton, Ohio, a corporation of Ohio Application December 23, 1946, Serial No. 717,883

6 Claims. (Cl. 171—324)

The present invention relates to electrical apparatus, more particularly to the brush rigging of rotary electrical apparatus, especially repulsion-induction motors.

In the ordinary type of motor which utilizes brushes and holders, it has been customary to arrange the holder about the shaft within the interior of the case or frame. In case of adjustment of the brushes, it was necessary to reach into the casing with the hand through any available opening to loosen the holder and then shift it to the adjusted position. This operation is obviously difficult, particularly in the case of small motors having only a little space available, and particularly hazardous while the motor was running. In case it was desired to inspect and replace the brushes, the end cover would normally have to be removed in order to obtain free access to the brush holder and contained brushes.

An object of the present invention is to provide an improved form of rotary electrical apparatus of the commutator brush type and in which the brush holder is so constructed and arranged that adjustment, inspection and complete removal of the brushes can be effected without inserting the hand into the interior of the casing of the apparatus and also without necessitating removal of the end cover.

Another object of the invention is to provide a motor construction such that the brush-holding device is completely accessible from the exterior of the rotary apparatus.

Still another object is to provide an improved brush holder which can be adapted to standard types of motor and eliminates the necessity for introducing the hand into the motor casing for adjustment or inspection of the brushes.

The above objects are attained, in brief, by providing a brush holder formed of as many arms as there are sets of brushes, these arms being integrally secured to a star-shaped ring about a circular hub which extends outwardly from the end cover in order that the holder may be rotated with respect to the hub. The small housings which carry the brushes are secured to the arms of the holder in any suitable manner, these housings being positioned immediately adjacent the commutator so as to permit the brushes to contact therewith in the usual manner.

The particular electrical device shown in the drawings is a repulsion-start induction-run motor. In a motor of this type the brushes bear on the commutator and provide for certain predetermined paths through the armature for the current during the starting period of the motor, so that the motor starts by the well known repulsion principle. After the motor comes up to a predetermined speed there is a short-circuiter which throws in and which shortcircuits all of the commutator bars, so that the motor then runs as a squirrel cage induction motor, the brushes being ineffective at this time. As will be explained further on in the specification, certain modifications could be made in the construction of the brush holder and the brushes in order to adapt it to different types of motors and generators but, inasmuch, as the repulsion-induction motor is probably the most used type, it has been illustrated in the drawings. It will be understood that a short-circuiter could be left off the armature, and in which case the motor would be purely a repulsion motor and would start and run by repulsion only.

The invention will be better understood when reference is made to the following description and accompanying drawings, in which:

Figure 1 represents a longitudinal section of a rotary electrical device provided with the improved brush holder. In this figure, the armature and commutator which have little or no bearing on the invention have been shown in elevation. Figure 1 may be indicated by the line 1—1 on Figure 2, but with the lower part of the motor in elevation.

Figure 2 is a sectional view taken along line 2—2 in Figure 1 and showing the manner in which the brush holder can be conveniently adjusted or removed from the motor.

Figure 3 is a small detail sectional view taken along line 3—3 in Figure 1 and showing the manner in which a spring tension is applied to the brush in order to provide an automatic feed.

Figure 4 is a fragmentary sectional view showing two brushes in position and contacting the bars of a commutator, taken on line 4—4 of Figure 1.

Figure 5 is a perspective view of the improved brush holder.

Referring to Figure 1, reference character 1 indicates the frame or casing of a motor or generator. This frame is usually cylindrical in shape and rests on the usual support 2 provided with feet 3 for bolting to a suitable support. The opposite ends of the frame or casing 1 are provided with shoulders 4 into which fit a pair of oppositely disposed end covers 5 which are bell-shaped and extend outwardly away from the ends of the casing. These covers are provided with flat depressed portions 6 and an opening 7 for receiving a bolt 8 secured to the end surfaces of the casing. Thus, by tightening the nuts 9, the two end covers are held rigidly in position at the shoulders 4 of the casing.

Within the casing, there is the usual laminated field core 10 and the field winding 11. An armature 12 of standard construction is adapted to rotate within the laminated field core, this armature having the usual windings, indicated at 13 and 14, of which the windings 13 are connected in the usual manner to a plurality of commutator bars, indicated at 15. These bars are held in position by a clamp plate 16 as is well-known in the art. The armature 12 is carried at one end on a shouldered shaft 17 and at the other end on another shouldered shaft 18 of somewhat greater length. The smaller shouldered portion of the shaft 17 is journalled in ball bearings 19, the outer race of which is supported within a ring 20 having a bore 21 of larger diameter and a bore 22 of smaller diameter, as indicated on the drawings. The ring 20 is provided with a shouldered portion 23 directly opposite the bore of larger size and this portion fits securely within a central bore provided in the end cover 5. The shoulder of the thicker portion 24 of the ring abuts the outside surface of the end cover to assist in holding the ring 20 rigidly in place. The shaft 17 preferably terminates at the outer edge of the ball bearing member 19 so that a considerable space is left within the bore 22 for receiving oily waste. Lubricant can be supplied to this waste through a self-sealing fixture 25 which is threaded in an opening which communicates with the bore 22. If desired, a closure member 26 having a springy periphery can be pressed into the bore 22 in order to retain the waste in position. It will be observed that the end of the spring at 34 extends through a hole in the arm 29 and that there is a second hole in the said arm spaced therefrom. This second hole provides an anchor for the end of the spring if it is desired to lift the brushes for any reason, such as to remove the brush holder from its mounted position.

For supplying the commutator with current as in case of a motor or for abstracting current in the case of a generator, brushes 27 of any suitable type may be employed. As illustrated in Figures 2 and 5, four such brushes are used depending on the manner in which the armature is wound. These brushes are located 90° apart and bear against the commutator bars. They are housed in square-shaped containers 28 formed as U-shaped members, the containers or housings being closed by arms 29 constituted of flat metal strips having sufficient thickness as to be quite rigid. These strips are provided at positions opposite the brush housings with arcuate slots 30 through which a pin 31 extends, this pin being tightly received by an opening in the brush. Thus, as the pin 31 is moved along the arcuate slot 30, the brush 27 is caused to recede farther out of the housing and thus to press against the commutator bars. The pin 31 forms an integral portion of a torsion spring 32 which is wrapped around an anchor 33 and is secured at the remote end to the strip 29, as indicated at 34. The purpose of the spring 32 is to cause the pin 31 to exert a constant downward pressure on each brush.

The strip 29 is integrally secured to the arm 35 of a star-shaped plate, indicated generally at 36. This plate has ring-shaped portions 37 interconnecting the arms 35 and a circular bore 38 which fits fairly loosely over the hub portion 24 of the ring 20. There is a pair of arcuate slots 39 disposed at the opposite ring sections 37, these slots being adapted to receive screws 40 which are fastened in the outer surface of the left-hand end cover as seen in Figure 1.

The last-mentioned end cover may be provided with openings 41, as many as there are arms 29 of the brush holder and having generally an elliptical shape. These openings are so positioned that the arms 29 of the holder 36 can readily extend therethrough and still permit rotational movement of the holder. It is apparent that when the screws 40 are loosened, the holder 36 is adapted to be rotated about the hub member 24 causing an adjustment, circular-wise of the four brushes about the commutator and upon tightening the screws 40, all of the brushes will rigidly maintain their adjusted position. It will be noted that this adjustment can be accomplished without having to insert the hand in the openings 41 as the screws 40 are available from the exterior of the end cover. Consequently, the brushes can be adjusted to bring about a no-spark condition or to cause the motor to reverse without reversing the input leads and while the motor is running since all the adjustments are accomplished from the exterior of the motor. Moreover, if it is desired to inspect the brushes or to insert a new brush or brushes, it is simply necessary to lift the brushes as described previously, remove the screws 40 entirely, in which case the holder as a whole can be slid from the hub 24 (assuming that the lubricating fixture 25 has been previously removed) replace in the same manner with the new brushes, and again adjust the fixed ends 34 of the springs 32 into their active position.

It is apparent that the openings 41 in the end cover need only be sufficiently large to receive the brush housing 28 although for ventilating purposes these openings may be made somewhat larger. It is also apparent that in the unimproved motors the removal of the end cover 5, which has heretofore been necessary to gain access to the brushes, necessitates considerable labor in that the support for one end of the armature 12 is removed. The armature, therefore, drops down onto the field laminations and this operation positively cannot be performed while the motor is running. In addition to rendering the motor inoperative during this period, there is also the danger of marring the end portion of the shaft 17 as it is being inserted in the ball bearing 19 because in the larger types of motors, the armature 12 is quite heavy and cumbersome to lift. On the other hand, by employing the improved form of brush holder, both the end cover and, therefore, the journal 19 are left in place so that the armature is also maintained in its running position.

If desired, a dust protecting canopy or shield 42 can be secured to the end cover, this canopy having a saucer-like shape and being detachably secured at its edges, indicated at 43, to the end cover in any suitable and well-known manner. This canopy is provided with one or more ventilating openings over which are placed dust-excluding grills or screens. If desired, these openings may be in line with the ventilating openings 41 and additional openings may be provided in line with the screws 40 so that it would not be necessary to remove the canopy, unless desired, in order to adjust the circular position of the brush holder.

The provision of this canopy or dust shield has been explained more fully and claimed in the Brown application, Serial No. 702,952, filed October 12, 1946, entitled "Electric motor construction," and assigned to the same assignee as the present application.

The construction as to the end of the frame opposite from the commutator end forms no part of the present invention and, therefore, does not require a detailed description. However, it will be noted that the end cover is similar to the cover provided at the commutator end of the motor and a dust-excluding canopy 42 is also provided. The shaft 8 is journalled in ball bearings similar to the opposite end but there has been provided a fan 44 secured to the shaft which draws in the air through the openings in the canopy and end cover causing this air to pass through the field windings and to some extent along the armature and then outward through the openings in the left-hand end cover and its canopy accessory. The shaft 18 is extended beyond the dust shield or canopy to provide a length for receiving a keyed pulley, not shown.

As mentioned before the device shown in the drawings is a repulsion-induction motor. It is conceivable, however, that a brush holder according to this invention could be employed with other types of motors or generators by making minor modifications in the said brush holder and the brushes. For example, if it was desired to use the brush holder with a type of rotary electrical apparatus which required that the several brushes be insulated from each other, this could be accomplished by lining the brush pockets with a suitable insulating means or by enclosing the brushes themselves with an insulating sleeve so that they did not come in contact with the metal part of the brush holder. The torsion spring 32 could be formed in this case of a non-conducting material, or only the end part which engages the brush directly, could be formed of insulating material, or the pocket in the brush into which the end of the spring extends, could be lined with insulating material. With the brushes so insulated from the brush ring individual leads would be run from each of the brushes for making connections therewith. It will be apparent that such modifications in the construction of the brush ring and pockets is well within the scope of one skilled in the art.

Thus, while I have explained the construction and use of the improved brush holder in connection, generally, with motors, it will be understood that the holder may be useful in other circumstances and that, if necessary, the brush holder can be somewhat modified to adapt it to these other uses.

It will be understood that various modifications and arrangements in structure could be made without departing from the spirit of my invention and, accordingly, I desire to comprehend such modifications and substitutions of equivalents as may be considered to come within the scope of the appended claims.

Having thus fully described my invention, what I claim as new and desire to secure by Letters Patent, is:

1. A brush holder for rotary electrical apparatus which includes an armature and a circular conductor element, said holder comprising a star-shaped plate from the arms of which extend a plurality of metal strips in parallel arrangement, the strips terminating in end housings adapted slidably to receive brushes, said plate having a pair of arcuate-shaped slots and a central bore, the bore being adapted to receive a hub projecting from the end cover of the rotary electrical apparatus and the slots being adapted to receive screws threaded into said end cover whereby the brush holder can be rotated about said hub when the screws are loosened and secured rigidly in its new position by tightening the screws.

2. In a brush holder for an electrical apparatus, a plate having a plurality of circumferentially spaced arms extending axially therefrom and in the same direction, brush pockets formed on the ends of said arms and opening substantially radially relative to the axis of said plate, slots in a wall of each pocket, and a torsion spring mounted on each arm and having one end extending through said slot to engage a brush in the associated pocket and to urge the said brush toward said axis.

3. In a brush holder for an electrical apparatus, a plate having a plurality of circumferentially spaced arms extending axially therefrom and in the same direction, brush pockets formed on the ends of said arms and opening substantially radially relative to the axis of said plate, slots in a wall of each pocket, a torsion spring mounted on each arm and having one end extending through said slot to engage a brush in the associated pocket and to urge the said brush toward said axis, and means detachably anchoring the other end of said spring adjacent the other end of its supporting arm whereby pressure can be applied to said brush or released therefrom.

4. An electric motor having a frame, an end cover for said frame, said cover having ventilating openings therein, field windings and an armature including a commutator contained within the frame, and a holder for positioning brushes against said commutator, said holder comprising a one-piece plate member having a part positioned exteriorly of the end cover and secured thereto and also having arms which extend through said ventilating openings to brush-supporting positions adjacent the commutator and which have their ends formed into brush receiving pockets, said pockets opening radially.

5. An electric motor having a frame, an end cover for said frame, said cover having ventilating openings therein, field windings and an armature including a comutator contained within the frame, said armature being journalled in said end cover, and a holder for positioning brushes against said commutator, said holder comprising a one-piece plate member having a part positioned exteriorly of the end cover and adjustably secured thereto and having arms which extend through said ventilating openings to brush-supporting positions adjacent the commutator, and said arms having their ends formed into radial brush pockets, said brush holder plate being adapted to be circularly adjusted in position about said end cover in order to change the relative position of all of the brushes with respect to the commutator.

6. Electrical apparatus comprising a stationary field member, a rotary member and a commutator secured to said rotary member, a casing for said members having an end cover journaling said rotary member and provided with openings, brush housings positioned directly adjacent the commutator and containing brushes which bear radially against said commutator, said housings being carried by metal strips which extend through said openings and are secured to a plate in common, said plate being adapted to rotate with respect to said end cover in order to cause simultaneous circular movement of the brush housings and contained brushes with respect to the commutator.

JOHN D. GAYER.

REFERENCES CITED

The following references are of record in the file of this patent:

UNITED STATES PATENTS

| Number | Name | Date |
|---|---|---|
| 316,093 | Weston | Apr. 21, 1885 |
| 1,315,796 | Scott | Sept. 9, 1919 |
| 1,594,398 | Wolkoff | Aug. 3, 1926 |